(No Model.)

A. B. SCHOFIELD.
CAR SEAL.

No. 599,066.  Patented Feb. 15, 1898.

Witnesses:—
George Barry Jr.
Fredk Haynes

Inventor:—
Albert B Schofield
by his attorneys

UNITED STATES PATENT OFFICE.

ALBERT B. SCHOFIELD, OF BROOKLYN, NEW YORK, ASSIGNOR TO THE KEYSTONE SEAL AND PRESS COMPANY, LIMITED, OF NEW YORK, N. Y.

CAR-SEAL.

SPECIFICATION forming part of Letters Patent No. 599,066, dated February 15, 1898.

Application filed April 12, 1897. Serial No. 631,734. (No model.)

*To all whom it may concern:*

Be it known that I, ALBERT B. SCHOFIELD, of Brooklyn, in the county of Kings and State of New York, have invented a new and useful Improvement in Car-Seals, of which the following is a specification.

My invention relates to an improvement in car-seals in which provision is made for catching the hooked end of a threading-wire within the socket in the uncompressed seal no matter in which direction the hook be turned when inserted into the mouth of the socket, for preventing tampering with the seal by splitting it edgewise to remove the end of the threading-wire or bail, and for rendering the threading-wire or bail easily manipulated, while at the same time retaining the spring action of the hook end to insure its catching on a shoulder in the socket.

Figure 1:
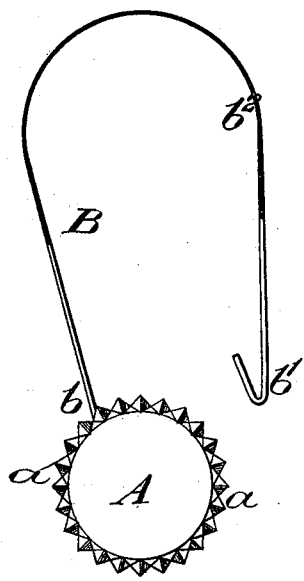
Figure 2:
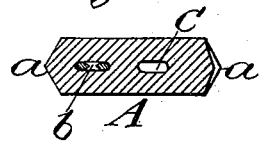
Figure 5:
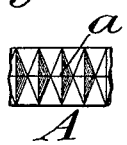
Figure 3:
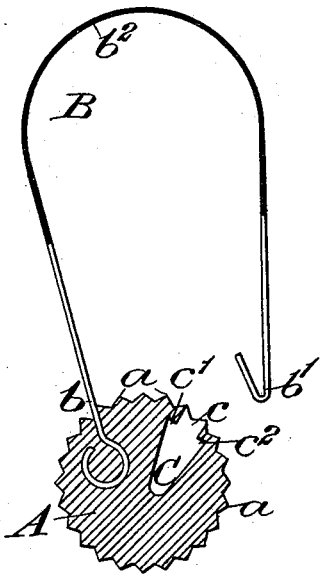
Figure 4:
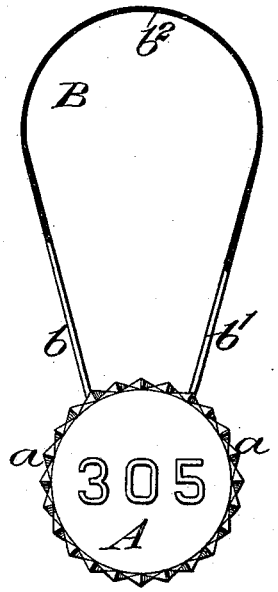

In the accompanying drawings, Figure 1 is a face view of the seal before the hook on the end of a threading-wire or bail has been inserted therein and before the seal has been compressed. Fig. 2 is a transverse section through the seal. Fig. 3 is an edgewise section through the seal. Fig. 4 is a face view of the seal compressed with the hook embedded therein; and Fig. 5 is an enlarged view of a portion of the edge of the seal, showing the particular structure of the serrations thereon.

The body of the seal is denoted by A. It is shown in the present instance as having a general circular form, its edge being made V-shaped and provided with a series of pyramid-shaped teeth $a$, which gradually increase in height from the edges of the opposite sides of the body portion.

The threading-wire or bail is denoted as a whole by B. One end $b$ of the threading-wire or bail is intended to be cast in the body of the seal and the opposite end $b'$ provided with a hook, as is common, and left free to be threaded through the eyes or openings in the fastenings of the door which is to be sealed.

Within the body A of the seal there is cast a socket C of sufficient size to freely receive the hook end $b'$ of the threading-wire or bail, the mouth $c$ of the socket being contracted, forming retaining-shoulders $c'$ $c^2$ upon the opposite sides of the mouth $c$, so that the end of the hook portion of the bail will catch upon either the one or the other of the shoulders $c'$ $c^2$, according to the direction in which the free end of the hook is turned when it is passed through the contracted portion $c$ of the socket. This feature of the shoulder upon each of the opposite sides of the contracted neck $c$ of the socket is an important one for the reason that the operator is no longer required to twist the free end of the wire after it has been threaded into a predetermined position in order to have its point catch upon the one shoulder heretofore employed, as it will be sure to catch no matter in which of two opposite directions the hook is inserted. Furthermore, it does away with the need of remembering on which side of the narrow neck the shoulder is located, a feature which has heretofore in practice given considerable annoyance, since the operator can no longer make a mistake as to the direction in which the hook should point. The pointed or pyramidal serrations herein employed and the V-shaped form of the edge of the seal furnish a very effective guard against tampering with the seal by splitting it edgewise to release an end of the threading-wire or bail and subsequently inserting it again and closing the two parts, rubbing down the edge to make it appear as though it had never been tampered with. Such an attempt would become obvious in the present instance, because, in the first place, it would be difficult to open the serrations along the lines of their apexes without showing variations in the line of opening to one side or the other, and the subsequent closure of the two parts would be certain to show distortions in the serrations.

The V-shaped edge of the seal and the gradual taper of the serrations down to the surface of the V-shaped edge prevents the distortion of the serrations during the compression of the seal to anchor the hooked end in its socket, since the metal at the edges of the opposite sides of the body portion will have no tendency to flow onto the V-shaped edge, but will simply tend to crowd the serrations bodily in radial directions outwardly from the center, leaving them intact.

To further provide for the ready manipulation of the free end of the threading-wire or bail in order to turn the hook flatwise with respect to the disk to insert it in its socket, I find it advantageous to anneal a portion of the threading-wire or bail, shown in the present instance by the portion which is blacked and denoted by $b^2$. In this event I prefer to leave the hooked end which is to be inserted in the body of the seal with sufficient temper to cause the point of the hook to spring outwardly and engage one of the shoulders $c'$ $c^2$ in the socket after the hook has been pressed inwardly through the contracted neck $c$ of the socket. It is obvious that the annealed portion may serve its purpose when made of lesser or greater length than that herein indicated, the advantage being in having a sufficient portion annealed to permit the ready twisting of the end which is to be threaded. It is further obvious that the advantage of annealing a portion of the bail or threading-wire will apply to other well-known forms of seal than that herein particularly shown and described. Hence I do not wish to limit its use to this particular form. It is further evident that slight changes might be resorted to in the form and arrangement of the several parts hereinabove described without departing from the spirit and scope of my invention. Hence I do not wish to limit myself strictly to the structure herein shown and described; but

What I claim is—

1. The seal comprising a body portion composed of compressible metal and provided with a socket for the reception of the end of the threading-wire or bail and with a series of projections of pyramidal form extending from the edge of the body portion throughout its periphery, and a threading-wire or bail, substantially as set forth.

2. The seal comprising a body portion composed of compressible metal and provided with a socket for the reception of the end of the threading-wire or bail and with a V-shaped edge surmounted throughout its periphery by pyramidal projections, the sides of the pyramidal projections being tapered down to the surface of the V-shaped edge to prevent flowing of the metal when the seal is compressed and a threading-wire or bail, substantially as set forth.

3. The combination with a seal composed of a single disk of compressible metal provided with a shouldered socket, of a threading-wire or bail having one end permanently embedded in the disk and the other end hook-shaped and adapted to enter the shouldered socket, the said bail having its hook end tempered and another portion malleable for readily adjusting the hook end to the socket, substantially as set forth.

ALBERT B. SCHOFIELD.

Witnesses:
GEORGE BARRY, Jr.,
EDWARD VIESER.